Sept. 25, 1951 W. KALS 2,568,891
HEAT EXCHANGE APPARATUS
Filed Oct. 26, 1945 3 Sheets-Sheet 1

INVENTOR
Walter Kals
BY
Popp and Popp
ATTORNEYS

Sept. 25, 1951  W. KALS  2,568,891
HEAT EXCHANGE APPARATUS
Filed Oct. 26, 1945  3 Sheets-Sheet 2
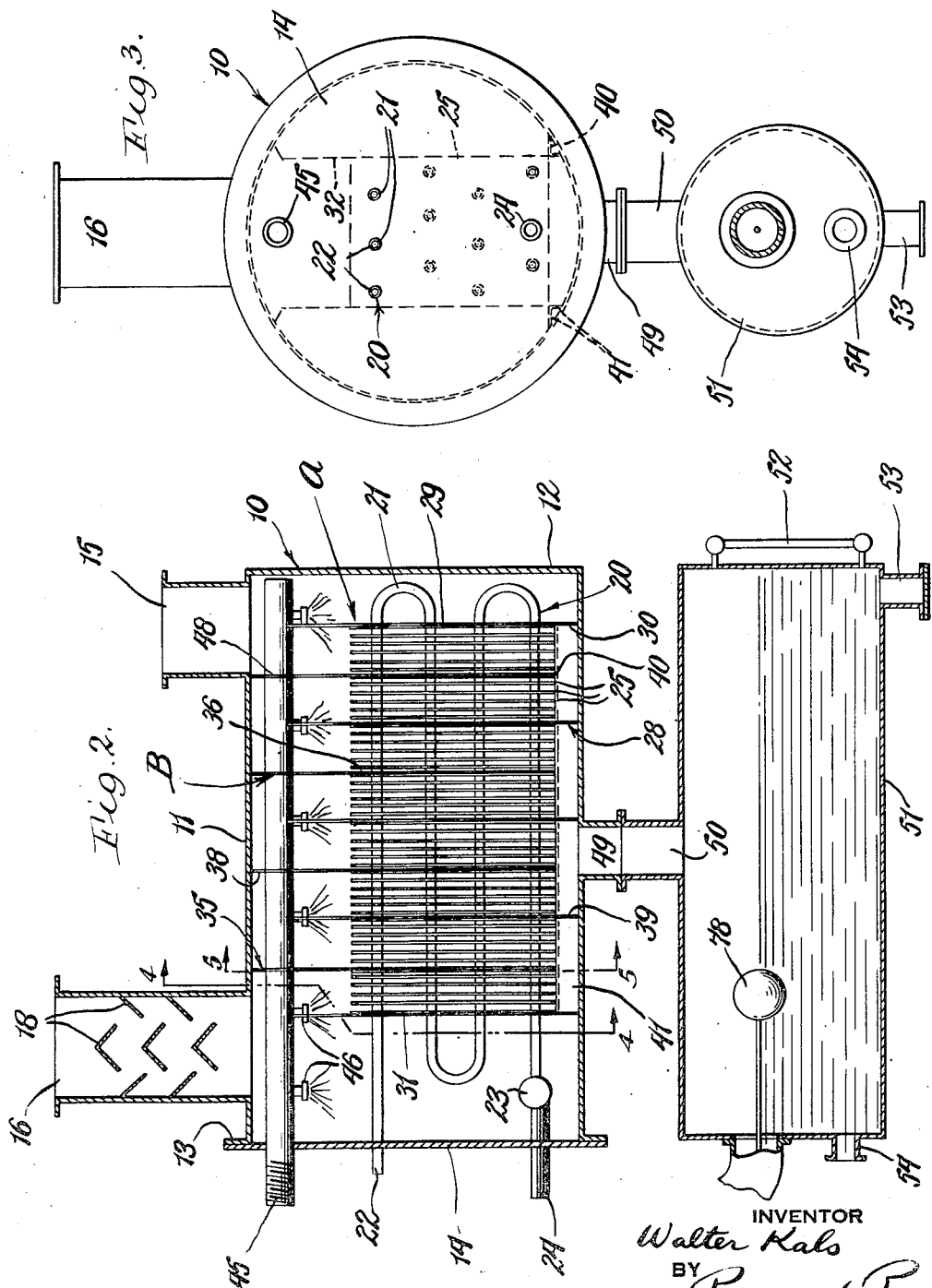
INVENTOR
Walter Kals
BY
Popp and Popp
ATTORNEYS Sept. 25, 1951 W. KALS 2,568,891
HEAT EXCHANGE APPARATUS
Filed Oct. 26, 1945 3 Sheets-Sheet 3
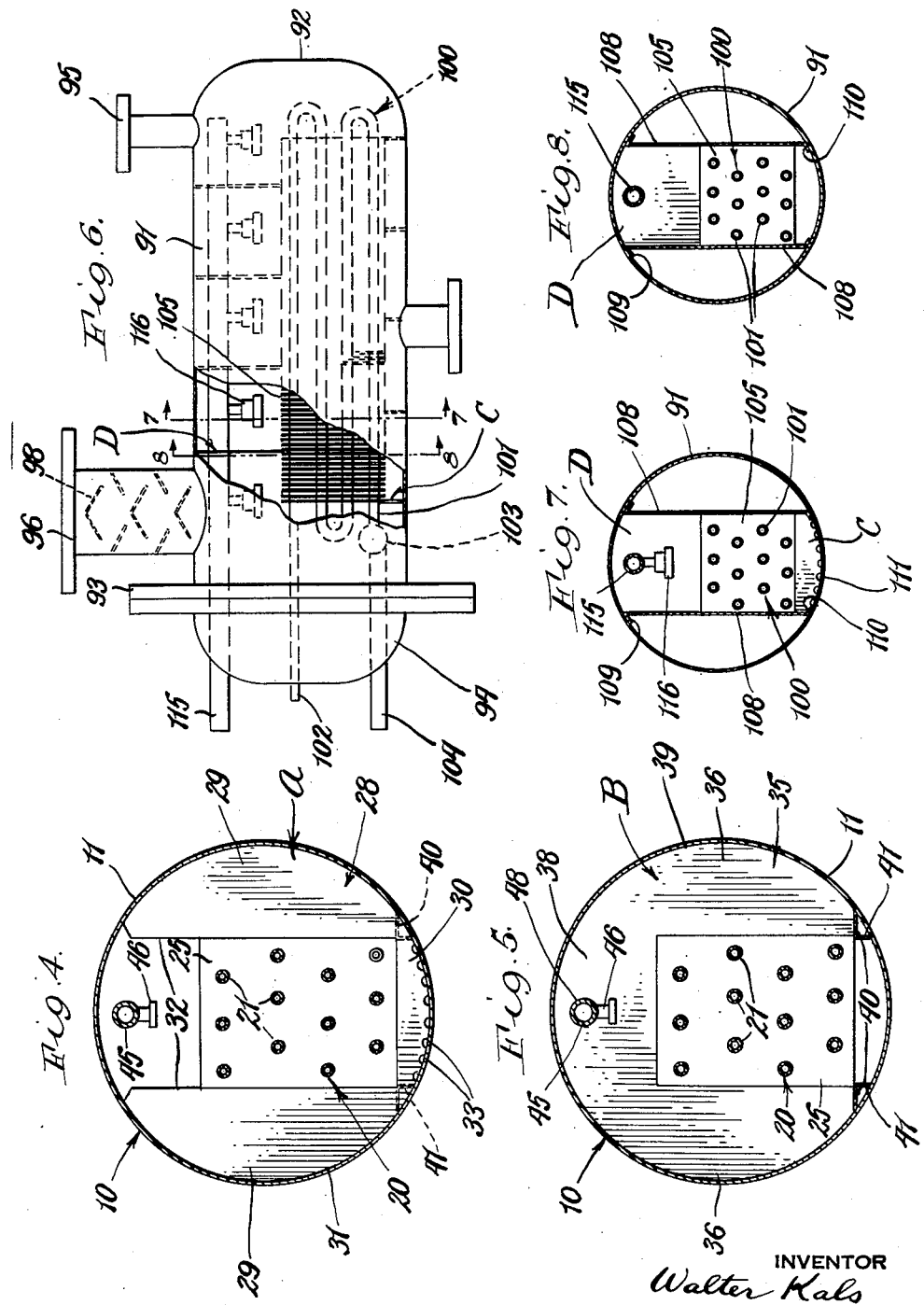
INVENTOR
Walter Kals
BY
Popp and Popp
ATTORNEYS Patented Sept. 25, 1951

2,568,891

UNITED STATES PATENT OFFICE 2,568,891

HEAT EXCHANGE APPARATUS

Walter Kals, New York, N. Y., assignor to Niagara Blower Company, New York, N. Y., a corporation of New York Application October 26, 1945, Serial No. 624,841

5 Claims. (Cl. 261—11)

This invention relates to heat exchange apparatus and more particularly to apparatus for cooling and dehumidifying gases used in processing other materials.

In various processes, particularly heat treating processes, it is desirable to effect a part of the processing in a chemically inert atmosphere to avoid undesired chemical reactions. For example, in the heat treating of certain metals, it is desirable to maintain an inert atmosphere in the heat treating furnace to avoid scaling or other undesired surface change of the metal parts under treatment. Further, in the processing of oils it is desirable to effect a part of the processing in a chemically inert atmosphere. Such chemically inert atmospheres are frequently maintained at a higher than atmospheric pressure so that there is no danger of contamination through leakage, any leakage merely resulting in loss of the chemically inert gas but not resulting in contamination of the atmosphere.

The chemically inert gas for such atmospheres is generally produced by the incomplete combustion of gaseous fuels, containing hydrocarbons, to provide carbon monoxide. As an example, the reaction in the incomplete combustion of methane is as follows:

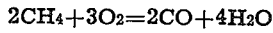

$$2CH_4 + 3O_2 = 2CO + 4H_2O$$

As will be seen, the reaction involves the production of quantities of water the presence of which in the inert atmosphere is harmful in producing blemishes, stains and other undesired effects. The moisture in the gas can be removed chemically by adsorbents, such as silica gel, activated alumina and the like or absorbents, such as lithium chloride brine, but such chemical removal requires reactivation of the adsorbent or absorbent thereby to require a cycling operation.

It is accordingly one of the principal objects of the present invention to effect the continuous dehumidification of gases under pressure to a very low dewpoint so as to provide an atmosphere having a very low moisture content.

Another object is to provide apparatus for the continuous dehumidification of gases under pressure to a very low dewpoint which is simple in construction and operation and which requires little supervision.

Another object is to provide such apparatus which can be readily set to maintain the exact degree of dehumidification desired.

Another object is to provide such apparatus which can be readily cleaned to maintain constant operation conditions.

Another object is to provide such an apparatus in which the gas under pressure is cooled to a low temperature to effect the condensation and removal of the moisture and in which there is no danger of freezing of the condensate on the low temperature cooling surfaces.

Another object is to provide such apparatus which embodies standard refrigeration apparatus the operation of which is well known as compared with adsorbent or absorbent practice.

Another object is to provide such apparatus which is free from the danger of leakage, such being a particularly important objective where deadly gases, such as carbon monoxide, are being handled.

Other objects and advantages will appear from the following description and drawings in which:

Fig. 2 is a vertical central section through one form of spray chamber and sump tank embodying the invention.

Fig. 3 is an end elevation of the apparatus shown in Fig. 2.

Figs. 4 and 5 are vertical sections, taken on the correspondingly numbered lines of Fig. 2.

Fig. 6 is a side elevation, partly broken away, of a modified form of spray chamber.

Figs. 7 and 8 are vertical sections, taken on the correspondingly numbered lines of Fig. 6.

Figure 1:
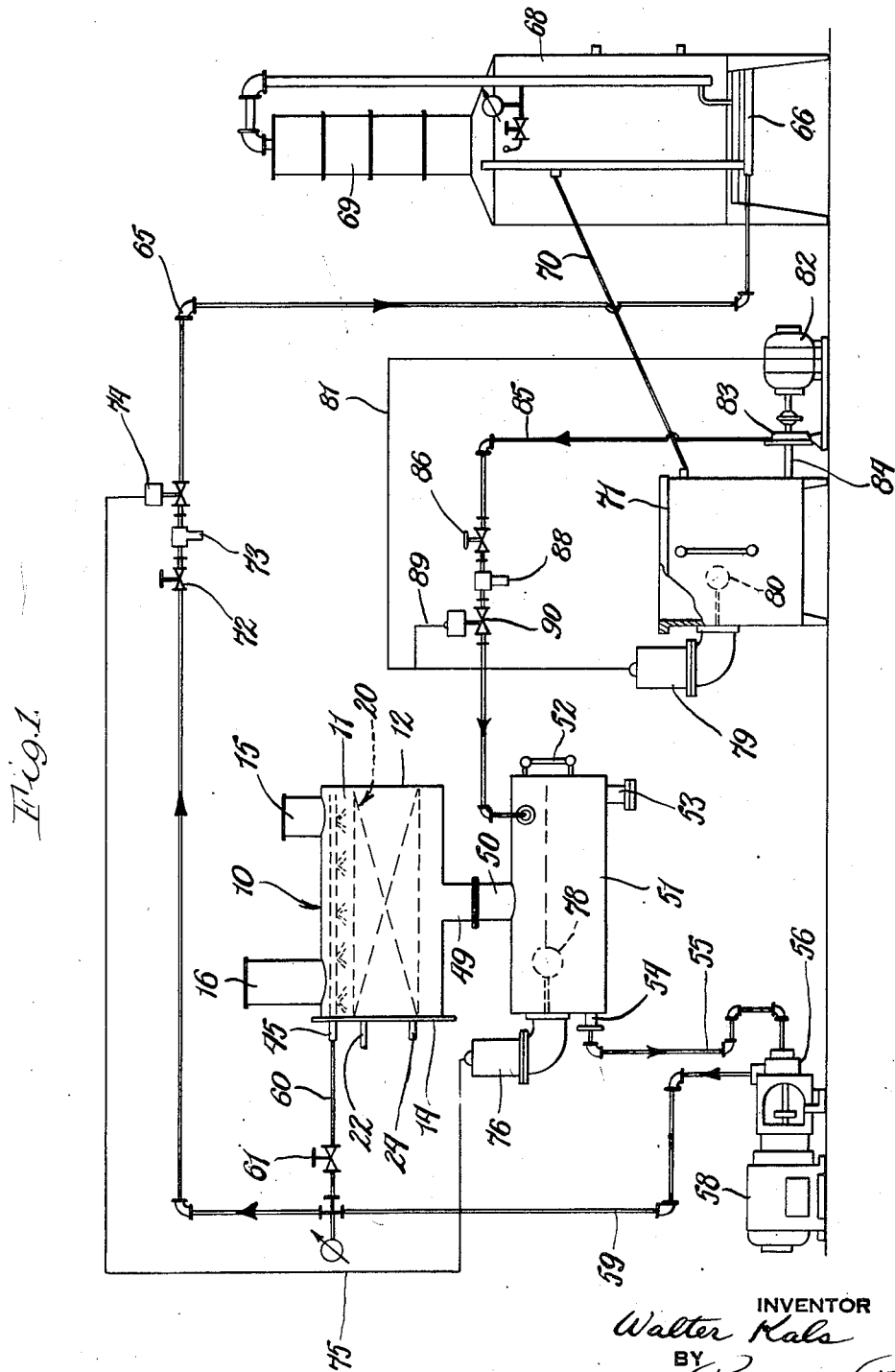
Fig. 1 is a diagrammatic side elevational view of heat exchange apparatus embodying the present invention.

In the form of the invention shown in Figs. 1–5, the gas under pressure is cooled by passing it through a cylindrical spray chamber 10 in which cooling coils are arranged so that the leaving temperature of the gas can be, say −45° F. With such a reduction in temperature of the gas the preponderance of its moisture is precipitated when passing through the spray chamber and hence upon reheating the leaving gas it is rendered substantially dry and capable of being used where substantially moisture-free gas is required. To prevent the removed moisture from condensing upon the cooling coils in the spray chamber 10, these coils are continuously washed by sprays, the spray liquid collecting and being recirculated from a sump tank below the spray chamber. This spray liquid is preferably a liquid of low freezing point which is miscible with water and to maintain the desired low freezing point of the mixture, which is, of course, being constantly diluted by the moisture removed from the gas, a reconcentrator is provided.

The spray chamber, as shown in Figs. 1–5, is preferably constructed as follows:

The numeral 11 represents a cylindrical shell which is formed to provide an integral end head 12. The opposite open end of this shell is flanged, as indicated at 13, and to this flange a removable end head 14 can be secured in any suitable manner. Adjacent the end head 21 the spray chamber is provided with a radially extending inlet 15 through which the gas under pressure is admitted to the casing 10, this inlet being shown as extending upwardly. At its opposite end the shell 11 is provided with an upwardly extending gas outlet 16 and which is shown as provided with eliminator plates 18 so that the leaving gas is whipped back and forth so as to remove any entrained moisture therefrom.

Within the spray chamber 10 is arranged an expansion coil 20, this coil comprising a plurality of serpentine tubes 21 each having a plurality of legs extending lengthwise of the cylindrical shell and connected by return bends. The upper inlet ends 22 of these tubes 21 extend through the removable end head 14 of the shell 11 and can be connected with a multiple outlet expansion valve (not shown). The lower outlet ends of the several tubes connect with an outlet header 23 having a suction line 24 extending through the removable end head 14. It will be understood that a suitable gas-tight joint is provided around the tube ends 22 and the suction line 24 to prevent leakage of the gas from the chamber 10. The horizontal legs of the tubes 21 are provided with spaced rectangular fins 25, the legs of the several tubes 21 extending through openings provided in each fin and good thermal contact being obtained by expanding the tubes 21 in these openings. The fins extend transversely of the shell 11 and are substantially smaller than the shell. The gas passing through the spray chamber 10 is diverted to pass transversely across the legs of the tubes 21 a plurality of times before being discharged through the outlet 16. For this purpose baffles, designated at A and B, are provided, these baffles A and B being arranged in alternation.

As best shown in Fig. 4 each baffle A comprises a sheet of metal 28 having sides 29 and a lower cross piece 30. The opposing vertical edges 32 of the sides 29 and the upper edge of the cross piece 30 are rectangular and fit the corresponding edges of any of the rectangular fins 25 of the expansion coil 20. The outer edge 31 formed by the sides 29 and the cross piece 30 is of semicircular form to fit the sides and bottom of the cylindrical shell 11. The sides 29 preferably extend above the fins 25 of the expansion coil, as best shown in Fig. 4. The cross piece 30 is provided in its under edge with a plurality of notches 33 which permit the spray liquid to drain along the bottom of the shell 11, as hereinafter described. The plates 28 are welded to the side and bottom edges of the fins 25 at spaced intervals along the expansion coil 20.

As best shown in Fig. 5 each baffle B comprises a sheet of metal 35 having sides 36 and an upper cross piece 38. The opposing vertical edges of the sides 36 and the lower edge of the cross piece 38 are rectangular and fit the corresponding edges of any of the rectangular fins 25 of the expansion coil 20. The outer edge 39 formed by the sides 36 and the cross piece 38 is of semicircular form to fit the sides and top of the cylindrical shell 11. The lower edges 40 of the sides 36 are horizontal and are coplanar with the lower edges of the fins 25 of the expansion coil. The plates 35 are welded to the side and top edges of the fins 25 at spaced intervals and midway between the baffles A.

In order to insure that the air passes over the coil 20 a plurality of angle pieces 41 are arranged along the opposite lower corners of the fins 25 between the baffles A and extending lengthwise of the spray chamber 10. The sides of these angle bars 41 fit the cylindrical interior of the shell 11 and thereby block the spaces between the lower corners of the group of fins 25 and the cylindrical shell 11 so that the gas is prevented from escaping through these spaces and is compelled to pass through the bank of expansion coils.

It will be seen that the finned expansion coil 20, together with the baffles A and B welded thereto, is removable as a unit with the end head 14, it being merely necessary to remove the fastening members for the end head 14 following which the entire cooling coil and baffle assembly can be removed as a unit axially from the cylindrical shell 11. The spray pipe 45, together with its nozzles 46, are similarly removable from the cylindrical shell 11 as a unit with the end head 14, expansion coil 20 and baffles A and B. For this purpose the spray pipe 45 is introduced through the removable end head 14 and extends through openings 48 provided in each of the baffles B. The spray nozzles 46 are arranged between each pair of the baffles B and between the end baffles B and the end heads of the cylindrical shell 11 so that all parts of the expansion coil 20 and its fins 25 are washed with the spray liquid. This spray liquid collects in the bottom of the cylindrical shell and flows to a bottom central outlet 49 for the cylindrical shell 11, this flow being permitted by the notches 33 provided in the bottoms of the baffles A.

The spray liquid outlet 49 connects with the inlet 50 of an enclosed cylindrical sump tank 51 which can have a sight glass 52 and a normally closed drain 53. The outlet 54 from this sump tank is shown as connected by a line 55 with the inlet of a pump 56 driven by an electric motor 58. The outlet line 59 from the pump 56 is connected by a branch line 60 with the spray pipe 45, a valve 61 being provided in the branch line 60 to regulate the flow of spray liquid to the spray pipe 45 and its nozzles 46.

It will be seen that the pump 56 provides a constant recirculation of the spray liquid, this pump forcing the spray liquid through its outlet line 59 and the branch line 60 to the spray pipe 45 from which this liquid is discharged in the form of sprays from the nozzles 46 against the fins and tubes of the expansion coil 20. The spray liquid collects in the bottom of the cylindrical shell 11 and flows through the notches 33 provided in the several baffles A to the outlet 49 where it flows down into the sump tank 51. From this sump tank the spray liquid is withdrawn through the outlet 54 and line 55 to the inlet of the pump 56 where it is again recirculated.

As previously indicated the expansion coil 20 is maintained at a very low temperature, in the order of —50° F., so as to provide a leaving gas temperature in the outlet 16 of the assumed —45° F. This is for the purpose of reducing the dewpoint of the gas to —45° F. so that when this gas is reheated it is substantially free from moisture. The moisture removed by cooling the air to this low temperature in the spray chamber 10 is added to the spray liquid being recirculated by the pump 56 and hence the spray liquid becomes increasingly dilute as the dehydration of the gas takes place. Such dilution would ultimately extend to the point where the diluted spray liquid would freeze on the expansion coil 20 and its fins 25 and hence automatic reconcentration of the spray liquid is required to maintain it at the required strength and to remove the water condensed from the gas under treatment.

To this end the antifreeze component of the spray liquid has a substantially higher boiling point than water and is reconcentrated by the apparatus illustrated in Fig. 1, this apparatus being constructed as follows:

The outlet line 59 from the pump 56 is provided with a branch 65 leading through a heat exchanger 66 to a boiler or concentrating tank 68. The spray liquid in this concentrating tank 68 is heated in any suitable manner to vaporize the water contained in the spray liquid. The water vapors pass out through a bubble tower 10 which is preferably constructed in accordance with the Olstad Patent No. 2,352,655, this bubble tower preventing the loss of any substantial quantity of the antifreeze component. The concentrated liquid from the concentrating tank 68 passes through the heat exchanger 66 in heat exchange relation with the incoming liquid and flows through a line 70 to an open tank 71.

The line 65 is provided with a hand valve 72 and a strainer 73 and the amount of liquid flowing through this pipe is proportioned to the degree of dilution effected by the passage of the gas through the spray chamber 10. To this end a solenoid valve 74 is provided in the line 65, this solenoid valve being connected by an electric line 75 with an electrical controller 76, this electrical controller being operated in response to the vertical movement of a float arm 78 in the sump tank 51 and opening or closing the solenoid valve 74. As dilution occurs the level of liquid in the sump tank 51 rises, this lifting the float arm 78 and actuating the electric controller to open the solenoid valve 74. In consequence a proportion of spray liquid is forced by the pump 56 through its outlet line 59 and branch 65 into the concentrating tank 68 where heat is applied to drive off the excess water, the concentrate being returned through the line 70 to the open tank 71.

This open tank 71 is in turn provided with an electric controller 79 which is actuated in response to a float arm 80. The electric line 81 from the electric controller 79 connects with an electric motor 82 driving a pump 83, the inlet 84 of this pump being connected with the bottom of the open tank 71. The outlet line 85 from the pump 83 is shown as provided with a hand valve 86 and strainer 88 and is shown as discharging into the sump tank 51. A branch 89 from the electrical control line of the electric controller 79 connects with a solenoid valve 90 in the pump outlet line 85. When the level of the liquid in the open tank 71 rises above a predetermined level the float arm 80 actuates the controller 79 to energize the electric motor 82 and to open the solenoid valve 90. In consequence the concentrated spray liquid is drawn by the pump 83 from the open tank 74 and discharged through its outlet line 85 into the sump tank 51. When the level in the open tank 71 is restored to the setting of the electric controller 79 this controller deenergizes the motor 82 and also closes the solenoid valve 79. The closing of the solenoid valve 79 prevents back pressures from developing in the line 85, the gas introduced into the spray chamber 10 being under a positive pressure.

In the operation of the form of the invention shown in Figs. 1-5, the gas, such as carbon monoxide obtained by the incomplete combustion of hydrocarbons such as methane and saturated with the water resulting from the incomplete combustion, is introduced under pressure at a temperature of, say, 90° F. through the inlet 15 of the spray chamber 10. This gas passes downwardly between the adjacent baffles A and B and passes under the lower edge of this baffle B. Since the inner edges of this baffle B are welded to the adjacent fin 25 of the bank of fins provided on the expansion coil 20 and since the outer semicircular edge 39 of this baffle closely fits the cylindrical shell 11, the gas cannot escape past this baffle but is required to pass downwardly and transversely across the legs of the tubes 21 of the expansion coil 20. The bypassing of any of this gas around the lower corners of the fins 25 is prevented by the adjacent endmost pair of angle bars 41 which are welded to the opposite lower corners of the fins between the baffles A. On passing under the first baffle B the air is deflected upwardly by the next succeeding baffle A. This baffle A has its outer semi-circular edge 31 fitted to the interior of the cylindrical shell 11 and consequently the gas cannot escape therearound. Its inner edges are welded to the adjacent one of the fins 25 of the expansion coil 20, and in consequence the gas returns upwardly, flowing transversely of the legs of the expansion coil 20 and among the several fins 25 arranged between the first baffle B and the next succeeding baffle A. Similar baffles A and B are secured in alternation at spaced intervals to the fins 25 of the expansion coil and hence the gas is deflected to pass vertically back and forth transversely across the expansion coil 20 and among its fins 25 before this gas can reach the outlet 16 from the spray chamber 10. The expansion coil is maintained at a temperature of, say, −50° F. so that the temperature of the gas leaving the outlet 16 is in the order of −45° F. On reheating this gas having a dewpoint of −45° F., it is substantially dry and can be used as the inert atmosphere in furnaces, oil processing and the like without danger of injury to the product because of an excessive moisture content.

On being reduced to this low temperature by the expansion coil 20 and its fins 25, the moisture originally present in the gas is condensed and to prevent the freezing of this condensate on the expansion coil 20 and its fins 25, the finned coil assembly is continuously washed with a spray liquid comprising an anti-freeze liquid having a boiling point substantially higher than water. This liquid is discharged from the spray pipe 45 through the nozzles 46 against the finned expansion coil 20, this liquid collecting in the bottom of the cylindrical shell and flowing out through its outlet 49 into the sump tank 51. The lower edges of the baffles A are notched as at 33, to permit the flow of spray liquid along the bottom of the cylindrical tank 11. The spray liquid in the sump tank 51 is withdrawn by the spray liquid pump 56 through the sump tank outlet 54 and line 55. This spray liquid is returned to the spray pipe 45 through the line 59 and branch 60.

Excessive dilution of the spray liquid must be prevented since otherwise this spray liquid would freeze upon the expansion coil 20 and its fins 25. To this end the float arm 78 is provided in the sump tank 51, this float arm actuating the electrical controller 76 to open and close the solenoid valve 74 in the branch line 65 leading from the outlet line of the spray water pump 56 through the heat exchanger 66 to the concentrating tank 68. In this concentrating tank 68 heat is applied to vaporize the water, the water vapor passing out through the bubble tower 69. The concentrated liquid returns through the heat exchanger 66 and line 70 to the open tank 71. When the level of the liquid in the tank 71 rises beyond a predetermined level, the float arm 80 therein actuates the electrical controller 79 to energize the electric motor 82 and to open the solenoid valve 90. The pump 83 is thereby actuated to withdraw the spray liquid from the open tank 71 through the pump inlet 84 and to discharge this liquid through the pump outlet line 85 and open solenoid valve 90 into the sump tank 51, thereby to return the concentrated spray liquid to the spray system.

A feature of the invention resides in the construction of the spray chamber 10. It will be noted that the cylindrical form of this spray chamber permits of handling gases at high pressures. At the same time the arrangement of the baffles A and B therein insures maximum heat transfer between the gas and the finned expansion coil 20, so that a minimum of surface is required, thereby to provide a compact unit capable of handling a large volume of gas at higher than atmospheric pressures. It will further be seen that the spray liquid pipe 45 is compactly arranged in the cylindrical spray tank 10 to adequately flood the expansion coil 20 and its fins 25 with the spray liquid to prevent freezing of the concentrate thereon and it will be seen that the diluted spray liquid readily escapes from the cylindrical spray chamber 11 to a separate sump tank 51 for recirculation through the sprays. It will also be noted that the entire refrigerating coil, baffle structure and spray water pipe 45 can be readily removed from the spray chamber 10 by the simple expedient of removing the removable end head 14 thereof and withdrawing this composite structure axially from the tubular shell 11 which forms the main enclosure of the spray chamber 10.

The modified form of spray chamber shown in Figs. 6–8 comprises a cylindrical shell 91 having an integral end head 92 at one end and having its opposite open end surrounded by an annular outwardly projecting flange 93. This open end of the cylindrical shell 91 can be closed by a removable end head 94 which can be detachably secured to the flange 93 in any suitable manner. The inlet 95 for the gas extends upwardly from the cylindrical shell 91 adjacent the end head 92 and the gas outlet 96 extends upwardly from the cylindrical shell 91 adjacent to the removable end head 94. As with the gas outlet 16 in the form of the invention shown in Figs. 1–5, the gas outlet 96 can be provided with eliminator plates 98 to remove any entrained moisture from the gas.

As with the form of the invention shown in Figs. 1–5, an expansion coil 100 is arranged in the shell 91, this expansion coil comprising a plurality of serpentine tubes 101, the inlet ends 102 of which extend through the removable end head 94 and can be connected to a multiple outlet expansion valve (not shown). The opposite ends of the serpentine tubes 101 connect with a header 103 having a suction line 104 extending through the removable end head 94. The horizontal legs of the tubes 101 are expanded into the openings of a plurality of rectangular fins 105 provided in regularly spaced relation along the horizontal legs of these tubes.

The bank of fins 105 are embraced by plates 108 which fit the opposite vertical sides of these fins at 105 and extend the full length of the cylindrical shell 91 and its end heads 92 and 94 so as to block off the opposite sides of this shell and provide a straight sided passage through the center of this shell and in which the bank of fins of the expansion coil 100 is fitted. These side plates 108 can be provided with upper flanges 109 and lower flanges 110 which engage the interior of the cylindrical shell 91 and can be welded thereto. However, these side plates can also be welded to the edges of the fins 105 of the expansion coil 100.

To provide baffles similar to the baffles A and B of the form of the invention shown in Figs. 1–5, a plurality of small baffles C are welded at spaced intervals to the lower edges of the fins 105 of the expansion coil at spaced intervals therealong. These baffles C extend downwardly and fit the bottom of the cylindrical shell 91 as well as the adjacent vertical sides of the side plates 108. These baffles C have their lower edges notched, as indicated at 111, to permit the flow of spray water along the bottom of the cylindrical shell 91.

Intermediate these baffles C, baffles D are welded to the upper edges of the fins 105 of the expansion coil 100. These baffles D extend upwardly to fit the curving top of the cylindrical shell 91 and have straight vertical sides fitting the side plates 108. These baffles D are penetrated by the spray pipe 115 which has spray nozzles 116 disposed to flood the entire expansion coil 100 and its fins 105 with the antifreeze liquid. As with the form of the invention shown in Figs. 1–5, this spray pipe 115 extends through the removable end head 94 so that the entire structure of expansion coil 100, its fins 105, the baffles C and D, and the spray pipe structure can be removed by the simple expedient of removing the removable end head 94 and withdrawing this entire structure axially from the cylindrical shell 91. A spray liquid outlet 118 is provided in the bottom of the shell 91 to permit the spray liquid to escape therefrom, such escape being permitted by the notches 111 in the baffles C.

It will be seen that the form of spray chamber shown in Figs. 6–8 operates in substantially the same manner as the spray chamber shown in Figs. 1–5. Thus, the warm moist gas entering the cylindrical shell 91 is forced by the baffles C and D, and the fins 105 to which they are welded, to whip back and forth transversely across the expansion coil 100 and among the fins 105 provided thereon. It will further be seen that adequate provision is made for the flooding of the expansion coil and its fins 105 with an antifreeze liquid and for the escape of this liquid from the shell. It will also be seen that this shell 91 is designed to withstand high pressures and that the entire cooling, air baffling and spray assembly can be removed as a unit by the simple expedient of removing the end head 94 and withdrawing this assembly.

From the foregoing it will be seen that the present invention provides an efficient apparatus for dehydrating gases under pressure, particularly carbon monoxide produced by the incomplete combustion of methane and with the resulting production of water. It will further be seen that the structure, particularly the spray chamber, is extremely compact and readily accessible for cleaning. The apparatus is also continuous in its operation, as compared with absorption or adsorption systems and can be readily operated by anyone familiar with refrigeration, thereby to elimiate the necessity for special information in its operation.

I claim as my invention:

1. In apparatus for cooling and dehumidifying gas under substantially higher than atmospheric pressure, a pressure-tight shell having an inlet at one end for gas under pressure and an outlet for said gas at its opposite end, a cooling coil arranged in a said shell and having an inlet and an outlet extending through said shell, fins fast to said cooling coil and forming an extended surface thereon, baffles in said shell each closely fitting the greater part of the internal cross sectional area of said shell, said baffles being alternately provided with apertures on opposite sides of said shell to deflect the gas to pass back and forth a plurality of times across said cooling coil and parallel with the fins thereof, a spray pipe extending through said shell above said cooling coil and through apertures in said baffles and supplied with an antifreeze liquid, downwardly directed nozzles on said spray pipe discharging said liquid against said fins to prevent frosting thereof, an outlet for the spray liquid in the bottom of the shell and means for recirculating the spray liquid from said spray liquid outlet through said nozzles.

2. In apparatus for cooling and dehumidifying gas under substantially higher than atmospheric pressure, a cylindrical horizontally disposed pressure-tight shell having an inlet at one end for gas under pressure and an outlet for said gas at its other end, a cooling coil arranged in said shell and having legs extending lengthwise thereof and having an inlet and an outlet extending through said shell, a series of transversely extending generally rectangular fin plates fast to the legs of said cooling coil and forming an extended surface thereon, said fin plates being substantially smaller than the internal cross sectional area of said shell and having their upper end lower edges horizontally disposed, certain of said fin plates at spaced intervals along said cooling coil being extended upwardly to said shell and other of said fin plates intermediate said certain plates being extended downwardly to said shell, said extensions of said fin plates providing baffles deflecting the gas to pass back and forth a plurality of times transversely across said legs of said cooling coil, blocking off means preventing the bypassing of said gas around the sides of said finned coil, an antifreeze liquid spray pipe extending longitudinally through said shell and through openings provided in said upward extensions of said fin plates, nozzles on said spray pipe and directed downwardly against the fins of said cooling coil to prevent frosting thereof, and means arranged to withdraw said spray liquid from the bottom of said shell and recirculate it through said spray nozzles.

3. In apparatus for cooling and dehumidifying gas under substantially higher than atmospheric pressure, a cylindrical horizontally disposed pressure-tight shell having an inlet at one end for gas under pressure and an outlet for said gas at its other end, a cooling coil arranged in said shell and having legs extending lengthwise thereof and having an inlet and an outlet extending through said shell, a series of transversely extending generally rectangular fin plates fast to the legs of said cooling coil and forming an extended surface thereon, said fin plates being substantially smaller than the internal cross sectional area of said shell and having their upper and lower edges horizontally disposed, certain of said fin plates at spaced intervals along said cooling coil being extended upwardly to said shell and other of said fin plates intermediate said certain plates being extended downwardly to said shell, said extensions of said fin plates providing baffles deflecting the gas to pass back and forth a plurality of times transversely across said legs of said cooling coil, blocking off means preventing the bypassing of said gas around the sides of said finned coil, comprising a bar arranged between each pair of said downwardly extending extensions on each side of said finned coil and extending lengthwise of said shell and secured to the lower corners of the fin plates between said downwardly extending extensions and in closely spaced relation to said shell, an antifreeze liquid spray pipe extending longitudinally through said shell and through openings provided in said upward extensions of said fin plates, nozzles on said spray pipe and directed downwardly against the fins of said cooling coil to prevent frosting thereof, and means arranged to withdraw said spray liquid from the bottom of said shell and recircuate it through said spray nozzles.

4. In apparatus for cooling and dehumidifying gas under substantially higher than atmospheric pressure, a cylindrical horizontally disposed pressure-tight shell having an inlet at one end for gas under pressure and an outlet for said gas at its other end, a cooling coil arranged in said shell and having legs extending lengthwise thereof and having an inlet and an outlet extending through said shell, a series of transversely extending generally rectangular fin plates fast to the legs of said cooling coil and forming an extended surface thereon, said fin plates being substantially smaller than the internal cross sectional area of said shell and having their upper and lower edges horizontally disposed, certain of said fin plates at spaced intervals along said cooling coil being extended upwardly to said shell and other of said fin plates intermediate said certain plates being extended downwardly to said shell, said extensions of said fin plates providing baffles deflecting the gas to pass back and forth a plurality of times transversely across said legs of said cooling coil, blocking off means preventing the bypassing of said gas around the sides of said finned coil, comprising a vertical plate arranged lengthwise of said shell on each side of said fin plates and in closely spaced relation to the vertical edges thereof and having its upper and lower edges arranged adjacent said shell to provide a straight sided vertical way through the center of said shell, an antifreeze liquid spray pipe extending longitudinally through said shell and through openings provided in said upward extensions of said fin plates, nozzles on said spray pipe and directed downwardly against the fins of said cooling coil to prevent frosting thereof, and means arranged to withdraw said spray liquid from the bottom of said shell and recirculate it through said spray nozzles.

5. In apparatus for cooling and dehumidifying gas under substantially higher than atmospheric pressure, an elongated pressure-tight shell having a removable end head and arranged with its axis horizontally disposed and having an inlet at one end for gas under pressure and an outlet for said gas at its opposite end, a cooling coil arranged in said shell and having legs extending lengthwise thereof and having an inlet and an outlet extending through said removable end head, transversely extending fin plates fast to the legs of said cooling coil and forming an extended surface thereon, certain of said fin plates at spaced intervals along said cooling coil being extended upwardly toward said shell and other of said fin plates intermediate said certain plates being extended downwardly toward said shell, said extensions of said fin plates providing baffles deflecting the gas to pass back and forth a plurality of times transversely across said legs of said cooling coil and parallel with said fin plates, an antifreeze liquid pipe extending through said removable end head and longitudinally of said shell through openings provided in said upwardly extending extensions of said fin plates, nozzles on said spray pipe and directed downwardly against the fins of said cooling coil to prevent frosting thereof, and means for withdrawing said spray liquid from the bottom of said shell and recirculating it through said spray nozzles, said finned coil, spray pipe and removable end head being removable as a unit from said shell.

WALTER KALS.

REFERENCES CITED

The following references are of record in the file of this patent:

UNITED STATES PATENTS

| Number | Name | Date |
|---|---|---|
| 1,079,005 | Haas | Nov. 18, 1913 |
| 1,891,713 | Jordan et al. | Dec. 20, 1932 |
| 2,038,536 | Bulkeley | Apr. 28, 1936 |
| 2,199,967 | Bichowsky | May 7, 1940 |
| 2,235,004 | Ashley | Mar. 18, 1941 |
| 2,273,804 | Newton | Feb. 17, 1942 |
| 2,378,964 | Williams | June 26, 1945 |
| 2,391,244 | Jackson | Dec. 18, 1945 |